(12) United States Patent
Bergemann et al.

(10) Patent No.: US 6,660,075 B2
(45) Date of Patent: Dec. 9, 2003

(54) CARBON BLACK

(75) Inventors: Klaus Bergemann, Kerpen-Sindorf (DE); Egon Fanghänel, Halle (DE); Thomas Lüthge, Leuna (DE); Karl Vogel, Alzenau-Michelbach (DE)

(73) Assignee: Degussa AG, Frankfurt am Main (DE)

( * ) Notice: Subject to any disclaimer, the term of this patent is extended or adjusted under 35 U.S.C. 154(b) by 0 days.

(21) Appl. No.: 09/964,862

(22) Filed: Sep. 28, 2001

(65) Prior Publication Data

US 2002/0096089 A1 Jul. 25, 2002

Related U.S. Application Data

(63) Continuation-in-part of application No. 09/808,425, filed on Mar. 15, 2001, now abandoned.

(51) Int. Cl.$^7$ .................................................. C09C 1/56
(52) U.S. Cl. ...................... 106/476; 106/472; 106/473; 106/474
(58) Field of Search ................................ 106/472, 473, 106/474, 476

(56) References Cited

U.S. PATENT DOCUMENTS 5,968,243 A * 10/1999 Belmont et al. ........... 106/31.6

FOREIGN PATENT DOCUMENTS

| DE | 1143951 | | 7/1959 |
|---|---|---|---|
| DE | 19738368 | | 3/1999 |
| EP | 481034 | | 4/1992 |
| EP | 569503 | * | 9/1994 |
| SU | 697533 | | 11/1979 |
| WO | 96/18688 | * | 6/1996 |

OTHER PUBLICATIONS

Patent abstract of JP 62–250073 (C–489) 1988, vol. 12/No. 128 (Apr. 1986).
German Search Report 10012783.5 dated Nov. 16, 2000.

* cited by examiner

Primary Examiner—Anthony J. Green
(74) Attorney, Agent, or Firm—Pillsbury & Winthrop LLP

(57) ABSTRACT

The present invention is directed to carbon blacks having organic groups. The organic groups are connected by one or two carbon atoms of a C—C single bond or double bond that are not a component of an aromatic system, contain at least one activating substituent on at least one carbon atom of the C—C single bond or double bond and contain no cyclic $C_3$ structure or 2,3-diazabicyclo[2.2.1]hept-2-ene. The invention includes methods of producing these carbon blacks in which black is reacted with organic compounds containing a C—C double bond or triple bond activated by at least one substituent. The carbon blacks can be used as fillers, reinforcing fillers, UV stabilizers, conductance blacks or pigments.

8 Claims, No Drawings

CARBON BLACK

CROSS REFERENCE TO RELATED APPLICATIONS

This is a continuation-in-part of U.S. Patent Application Ser. No. 09/808,425, filed on Mar. 15, 2001, now abandoned, and claims priority from German application No. 100 12 783.5, filed on Mar. 16, 2000. Both applications are incorporated herein by reference in their entirety.

FIELD OF THE INVENTION

The invention relates to carbon blacks, methods of producing carbon blacks and methods by which carbon blacks are used.

BACKGROUND OF THE INVENTION

EP 0 569 503 teaches a method for the surface modification of carbon-containing material with aromatic groups by electrochemical reduction of a diazonium salt. It also known that carbon blacks ("blacks") can be linked to organic groups by a diazonium group produced via the primary amine (WO 96/18688).

The known methods have the following disadvantages:

An alkyl group or preferably an aryl group is required as a linking group; the modification therefore always takes place at a rather distant interval from the carbon black surface. A direct screening of the carbon black surface with closely applied polar groups is impossible. The modification does not take place in the immediate vicinity of the surface.

The carbon black is contaminated with acids and/or salts. In addition to the actual modification reagent, additional acids must be used in order to adjust the pH. These acids are not bound to the carbon black but rather constitute an impurity in the carbon black or must be removed by purification steps.

The non-ionic, organic nitrites that can also be used for diazotization are poisonous and readily combustible. Groups of the nitrites (counterions, alkyl groups) remain unbound as contaminants in the carbon black.

The use of nitrite in an acidic medium is required to carry out the diazotization. Poisonous nitrogen oxides can develop from this.

The modification by means of diazonium salts takes place primarily in aqueous phase. Due to the high evaporation enthalpy of water, the subsequent necessary drying requires a high expenditure of energy, resulting in substantial expense.

Black pigments may be produced by the cycloaddition of 1-methylene-4,8-dioxaspiro [2.5]octane-4,8-dioxaspiro[2.5] oct-1-ene derivatives and/or 2,3-diazabicyclo-[2.2.1 ]hept-2-ene derivatives on the black surface (JP 11315220). However, this process is expensive and has the disadvantage of possible instability of $C_3$ rings.

SUMMARY OF THE INVENTION

It is an object of the present invention to provide a carbon black with organic groups, wherein:

the polar groups directly screen the surface;

the modification of the carbon black is sufficiently variable that the groups can be directly over the surface and/or far removed from it;

the modification takes place in the direct vicinity of the surface;

the resulting carbon black is not contaminated by acids, salts and the like, so that no purification is required;

the carbon black does not have to be dried with a high expenditure of energy;

no poisonous waste gases are produced during the modification;

no solvents or only slight amounts of solvents that can be readily removed are required;

the modification is possible without solvents; and the modification can be carried out with the simplest compounds possible.

The invention has as subject matter a carbon black with organic groups, characterized in that the organic groups are connected to the black via at least one or two carbon atoms of the C—C single bond or double bond that are not a component of an aromatic system, contain at least one activating substituent on at least one carbon atom of the C—C single bond or double bond and contain no cyclic $C_3$ structure or 2,3-diazabicyclo[2.2.1]hept-2-ene.

Activating substituents can be, for example, acceptor substituents. Acceptor substituents can be —COOR, —CO—R, —CN, —SO$_2$R, —SO$_2$OR, —CO—X—CO—, with R=H, alkyl, aryl or functionalized alkyl or aryl, X=O or N—R$^5$, R$^5$=alkyl, Y-functionalized alkyl, polymers, cyclic organic groups, aryl or Y-functionalized aryl of the form Ar—Y$_n$ (n-1-5), Y=—OH, —SH, —SO$_3$H, —SO$_3$M, —B(OH)$_2$, —O(CH$_2$—CH$_2$—O)$_n$—H, —COOH, —COOM, —NH$_2$, —NR$_2$, —N((CH$_2$—CH$_2$—O)$_n$H)$_2$, CON ((CH$_2$—CH$_2$—O)$_n$H)$_2$, trialkoxysilyl, perfluoroalkyl, R$^5$, —NH$_3^+$, —NR$_3^+$, —SO$_2$—NR$_2$, —NO$_2$, —Cl, —CO—NR$_2$, —SS— or —SCN, M=metal, e.g., alkali$^+$ or alkaline earth$^{++}$.

The carbon black used can be any known black such as, e.g., furnace black, gas black, channel black, flame black, thermal black, acetylene black, plasma black, inversion blacks (known from DE 195 21 565), Si-containing blacks (known from WO 98/45361 or DE 19613796), metal-containing blacks (known from WO 98/42778), arc blacks and blacks that are the byproducts of chemical production processes. The black can be activated by established reactions. Blacks can be employed that are used as reinforcement filler and rubber mixtures. Colored blacks can be used. Other blacks can be: conductivity black, black for UV stabilization, black as filler in other systems than rubber such as, e.g., in bitumen, plastic, black as reducing agent in metallurgy.

The primarily applied groups can be further modified by subsequent reactions.

It is a further object of the invention to provide a carbon black having an organic group. This carbon black can be obtained by reacting the black with organic compounds containing a C—C double bond or triple bond, the C—C double bond or triple bond which is activated by at least one substituent. The organic group should contain no cyclic $C_3$ structure or 2,3-diazabicyclo[2.2.1]hept-2-ene.

A further object of the invention is to provide a method of producing a carbon black of the invention. This method is characterized in that black is reacted with organic compounds containing a C—C double bond or triple bond, the C—C double bond or triple bond of which is activated by at least one substituent and in that the organic group contains no cyclic $C_3$ structure or 2,3-diazabicyclo[2.2.1]hept-2-ene. Organic compounds containing a C—C double bond or triple bond that can be used comprise all compounds that carry suitable acceptor substituents for activating the multiple bonds.

The substituents can be tailored to suit the potential areas of application since the reaction principle discovered permits the introduction of hydrophilic as well as lipophilic groups. The groups can also be reactive ionically, polymerically or for further reactions.

Organic compounds with acceptor substituents can be compounds of formula I, in which $R^1$, $R^2$, $R^3$ and $R^4$ can be the same or different

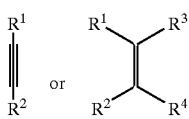
(I)

with $R^1$=—COOR, —CO—R, —CN, —SO$_2$R, —SO$_2$OR, $R^2$, $R^3$, $R^4$=$R^1$, H, alkyl, aryl, —COOM with M=H$^+$, alkali$^+$, alkaline earth$^{++}$, Cl and other non-acceptor substituents and R=H, alkyl, aryl or functionalized alkyl or aryl such as, e.g., ω-carboxyalkyl, carboxyaryl, HSO$_3$-alkyl-, H$_2$N-alkyl-, H$_2$N-SO$_2$-alkyl-, HSO$_3$-aryl-, H$_2$N-aryl-, H$_2$N—SO$_2$-aryl- and similar groups.

Maleic acid anhydride and maleic acid imides of general formula II can be used as organic compounds (II)

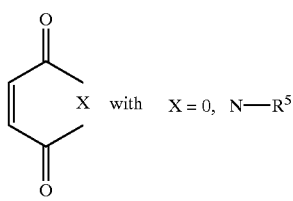
(II)

The group $R^5$ be as defined above or it can:

be an aliphatic group, a cyclic organic group or an organic compound with an aliphatic part and a cyclic part, be substituted or unsubstituted, branched or unbranched, comprise an aliphatic group, e.g., groups of alkanes, alkenes, alcohols, ethers, aldehydes, ketones, carboxylic acids, hydrocarbons, be a cyclic compound, e.g., alicyclic hydrocarbons such as, e.g., cycloalkyls or cycloalkenyls, heterocyclic compounds such as, e.g., pyrrolidinyl-, pyrrolinyl-, piperidinyl or morpholinyl, aryl groups such as, e.g., phenyl, naphthyl or anthracenyl, and heteroaryl groups such as, e.g., imidazolyl, pyrazolyl, pyridinyl, thienyl, thiazolyl, flryl or indolyl, be substituted by further functional groups, be a chromophoric group or a dye.

Unsaturated compounds such as, e.g., p-benzoquinone or ethylvinyl ether can be also used as the organic compound with acceptor substituents.

For compounds according to formula II with X=O, there is the possibility of subsequently functionalizing the products of the type of substituted succinic acid anhydrides, e.g., by basic or acidic ring opening, by semi-ester formation with alcohols or alcoholates as well as by amide formation with amines and subsequent thermal imidization in the case of primary amines. When ammonia is used, accumulating imides can also be subsequently substituted on the nitrogen.

The organic compound with acceptor substituents can be applied on the black by being mixing in or sprayed on. The organic compound with acceptor substituents can be applied as powder, melt or solution. It is especially advantageous if the organic compound with acceptor substituents is applied during the production of the black, during which the addition of the organic compound takes place at a location exhibiting the necessary temperature.

The reaction for modifying the black can preferably be carried out without solvent or in a solvent, preferably a readily volatile, organic solvent. The reaction for modifying the black can take place by tempering. Modification can take place at temperatures of 0° to 250° C, preferably from 80° to 140° C.

The blacks in accordance with the invention can be used, e.g., as filler, reinforcing filler, UV stabilizer, conductance black or pigment in rubber, plastic, printing inks, inks, inkjet inks, paints and dyes, bitumen, concrete and other construction materials or paper. They can also be used as reducing agents in metallurgy.

The blacks of the invention have the advantage that:

Blacks modified in a polar manner (e.g., with —SO$_3$— groups) can be better dispersed in polar systems such as water, Blacks modified in a non-polar manner (e.g., with alkyl groups) can be better dispersed in non-polar systems such as, e.g., oils, Suitably modified blacks with polar or sterically bulky groups are stabilized in the systems electrostatically or sterically, Blacks modified in accordance with the method of the invention are better stabilized in dispersions and thus exhibit better coloristic properties such as color depth and bluishness, Blacks with bound dyes or chromophoric groups exhibit altered color tones, Blacks with substituents that continue to be reactive can be used for coupling and cross-linking in systems (e.g., rubber), Reactively modified blacks make it possible to bind the black to the polymer, Blacks can be produced that are low in byproducts, salts, acids and moisture, The polar groups directly screen the surface, The modification of the black is so variable that the groups can be directly over the surface and/or also very far removed, The modification takes place in the immediate vicinity of the surface.

EXAMPLES

Example 1

Modification of Black in Solid Phase with Maleic Acid Anhydride 2 g maleic acid anhydride is dissolved in 150 ml acetone, compounded with 10 g black (FW1 or Printex 35) and agitated 30 minutes at room temperature. The solvent is subsequently drawn off in a vacuum and the black tempered five hours in a muffle furnace at 180° C. The resulting black carries carbonic acid anhydride groups.

Example 2

Modification of Black in Toluene with Maleic Acid Anhydride 2 g maleic acid anhydride is dissolved in 200 ml toluene and compounded with 10 g black (FW1 or Printex 35). The suspension is boiled 4 to 16 hours under reflux and then drawn off, washed with toluene and dried eight hours in a drying oven at 105° C. The resulting black carries carbonic acid anhydride groups.

Example 3

Basic Ring Opening Reaction and Neutralization in Black Modified with Maleic Acid Anhydride for the Production of Carboxylate Groups 10 g of a black modified in accordance with Example 1 or Example 2 (FW 1 or Printex 35) is agitated two hours in 100 ml 1N KOH solution. The KOH solution is then drawn off and the filter residue washed with water until the pH is in the neutral range (pH≈6–7). The modified black is subsequently dried eight hours at 100° C. The resulting black carries carboxylate groups.

Example 4

Reaction with Maleic Acid and Subsequent Neutralization 2 g maleic acid is dissolved in 100 ml water. 10 g black (FW1 or Printex 35) is added to the solution and the suspension boiled two hours under reflux, then drawn off, the filter residue washed with 100 ml water and subsequently agitated two hours in 100 ml 1N KOH solution. The black is drawn off and washed with water until the pH is in the neutral range. The matter is subsequently dried eight hours at 100° C. The resulting black carries carboxylate groups.

Example 5

Reaction with Monopotassium Salt of Acetylene Dicarboxylic Acid 2 g of monopotassium salt of acetylene dicarboxylic acid is dissolved in 150 ml water and 10 g black (FW1 or Printex 350 added to the solution. The suspension is boiled one hour under reflux and subsequently drawn off. The modified black is then washed with 200 ml water and dried eight hours at 100° C. The resulting black carries carboxyl groups and carboxylate groups.

Example 6

Reaction with Fumaric Acid 2 g fumaric acid is suspended in 150 ml acetone. 10 g black (FW1 or Printex 35) are added to the suspension and the suspension boiled two hours under reflux. The solvent is then distilled off in a vacuum and the mixture heated 48 hours to 120° C. The resulting black carries carboxylate groups.

Example 7

Modification of Black with the Sodium Salt of N-(4-sulfonatophenyl) Maleic Acid Imide in Solid Phase 2 g of the sodium salt of N-(4-sulfonatophenyl) maleic acid imide are dissolved in 150 ml water and compounded with 10 g black (FW1). The water is distilled in a vacuum. The mixture is then heated 5 hours to 180° C. The modified black is then washed with 200 ml water and subsequently dried eight hours at 100° C. The resulting black carries sodium sulfonate groups.

Example 8

Modification of Black with the Sodium Salt of N-(4-sulfonatophenyl) Maleic Acid Imide in Water 2 g N-(4-sulfonatophenyl) maleic acid imide is dissolved in 100 ml water, compounded with 10 g black (FW 1) and heated 4 hours on the reflux. The matter [modified black] is drawn off, washed with water and dried eight hours in a drying oven at 105° C. The resulting black carries sodium sulfonate groups.

Example 9

Modification of Black with N-(4-sulfamoyl-phenyl) Maleic Acid Amide in Solid Phase 5 g N-(4-sulfamoyl-phenyl) maleic acid amide is dissolved in 250 ml acetone, compounded with 25 g black (FW 1 or Printex 35) and agitated 30 minutes at room temperature. The solvent is subsequently drawn off in a vacuum and the black tempered five hours in a muffle furnace at 180° C. The resulting black carries sulfonamide groups.

Example 10

Modification of Black with N-dodecylmaleic Acid Amide 2 g maleic acid amide N-dodecylmaleic acid amide are dissolved in 150 ml toluene and compounded with 10 g black (FW 1 or Printex Alpha). The suspension is boiled four hours under reflux and then drawn off, washed with acetone and dried eight hours in a drying oven at 105° C. The resulting black carries dodecyl groups.

Example 11

Qualities of the Modified Blacks (FW 1 or Printex 35) in Paint Systems Containing Solvent The specimens are ground in a polar 2K system containing solvent, namely, the Synthanal LS 768 system, that is subsequently cross-linked with Desmodur N 75.

TABLE 1

| Component | % |
|---|---|
| Synthalan LS 768 | 68 |
| Butylacetate 98% | 22.9 |
| FW1/Printex 35 | 9.1 |

The paint is applied with a Desmodur N 75 and Synthalan LS 768. The concentration of black in the coat is 5% relative to "solid binder".

Dispersing Conditions:

The Dispersing is Carried Out in 2 Steps:

1. Laboratory dissolver:

Dispersing time: 5 min, 4000 rev. min$^{-1}$
   Disk diameter: 40 mm
   Circumferential speed: 8.37 m/sec -continued

| 2. | Skandex dispenser BA-S20: | |
| --- | --- | --- |
| | Dispersing time: | 60 min |
| | Grinding bodies: | 550 g steel balls Ø 2 mm |
| | Cooling: | Stage 2 |

Viscosity Behavior:

The viscosity is tested with a rotational viscometer from the Haake company. The flow curve is recorded thereby.

Results of the testing of Printex 35 modified with maleic acid anhydride using application technology in a paint system containing solvent are shown in table 2.

TABLE 2

| Specimen | My | dM | η (100 s-1) |
| --- | --- | --- | --- |
| Printex 35 elementary [original] black | 228 | −3.5 | 900 mPas |
| Printex 35 modified according to examples 1 and 3 | 229 | 2.0 | 800 mPas |

The modified black has a bluer shade and displays reduced viscosity.

Results of the testing of FW 1 modified with sulfonamide groups using application technology in a paint system containing solvent are shown in table 3.

TABLE 3

| Specimen | My 5% | dM 5% |
| --- | --- | --- |
| FW1 elementary [original] black | 277 | −1.4 |
| FW 1 modified according to example 9 with $SO_2NH_2$ groups | 293 | 12 |

The modified black clearly has a deeper color and a significantly bluer shade.

Example 12

Qualities of the Modified Blacks in Hydrous Systems

The pigment blacks are dispersed in aqueous systems I (table 4) and II (table 5) containing wetting agent and free of binding agent.

TABLE 4

| Paint system I: | |
| --- | --- |
| Component | % |
| Water | 55 |
| Tegofoamex 830 | 0.30 |
| AMP 90 | 0.60 |
| Tego Dispers 750 W 40% | 24.9 |
| Pigment blacks | 13 |

TABLE 5

| Component | G |
| --- | --- |
| Paint system II: Mother [parent, stock] paint A | |
| Tegofoamex 830 | 1.3 |
| Tego Dispers 750 W 40% | 175.4 |
| Grinding material recipe Printex 35/SS4 | |
| Mother paint A | 64.2 |
| AMP 90 | 0.49 |
| Pigment black | 9.5 |

The paint is applied with Alberdingk U 710 30%. The concentration of black relative to binding agent (solid) is fixed at 10%.
Dispersing Conditions:
The Dispersing is Carried Out in 2 Steps:

| 1. | Laboratory dissolver: | |
| --- | --- | --- |
| | Dispersing time: | 5 min, 4000 rev. min$^{-1}$ |
| | Disk diameter: | 40 mm |
| | Circumferential speed: | 8.37 m/sec |
| 2. | Skandex dispenser BA-S20: | |
| | Dispersing time: | 60 min |
| | Grinding bodies: | 275 g chromanite steel beads Ø 2 mm |
| | Cooling: | Stage 2 |

Results of the testing of Printex 35 modified with maleic acid anhydride using application technology in hydrous paint system I are shown in table 6.

TABLE 6

| Specimen | My 10% | DM 10% |
| --- | --- | --- |
| Printex 35 elementary [original] black | 237 | 1.9 |
| Printex 35 modified according to examples 1 and 3 | 241 | 3.8 |

The modified product has a deeper color and a bluer shade.

Results of the testing of Printex 35 modified with sulfanilamide using application technology in hydrous paint system II containing solvent are shown in table 6.

TABLE 7

| Specimen | My 10% | dM 10% |
| --- | --- | --- |
| Printex 35 elementary [original] black | 222 | 1.1 |
| Printex 35 modified according to example 9 | 230 | 5 |

The functionalized specimen has a deeper color and a bluer shade.

The system components of the paint systems used in examples 11 and 12 are products of the following companies:

| Alberdink U 710 30% | Alberdink Boley |
| --- | --- |
| Tegofoamex 830 | Tego Chemie Service GmbH |
| Tego Dispers 750 W 40% | Tego Chemie Service GmbH |
| AMP 90 | Merk KgaG |

| | |
|---|---|
| Desmodur N 75 | Bayer AG |
| Synthalan LS 768 | Synthopol Chemie |

The My values cited in the examples are determined according to DIN 55979. The dM value is determined as follows:

The values X, Y and Z are determined according to DIN 6174. The color-tone-independent black number My can be determined from these values according to the formula 100 log(Yn/Y)=My. In a similar manner the color-tone-dependent black number Mc is calculated according to the formula 100 (log(Yn/Y)+log (Xn/X)−log(Zn/Z)=Mc. The color-tone part [contribution] dM is calculated according to dM=Mc−My=100 (log(Xn/X)−log(Zn/Z)). The greater the dM value, the bluer the shade of the carbon black; the smaller the dM value, the browner the shade of the carbon black.

Example 13

Qualities of the Blacks Modified According to Example 10 with Dodecyl Groups as Regards their Water Adsorption The black specimens are dried overnight at 120° C., cooled off in a desiccator over silica gel in a vacuum and then weighed in small open glass dishes. The blacks are then stored in the desiccator at room temperature over a concentrated sodium chloride solution (rel. air humidity approximately 85%) and tared [weighed out] at fixed time intervals.

The water adsorption is calculated from the relative increase in weight of the black specimens and is entered in the following as a function of the storage time at 85% air humidity (table 8).

TABLE 8

Increase in weight of the black specimens due to water adsorption in % by mass as a function of the residence time in a moist atmosphere in hours

| | Water adsorption in % by mass relative to the amount of black | | | |
|---|---|---|---|---|
| Residence time in moist atmosphere in hours | FW 1 | FW1 alkylated according to example 10 | Printex Alpha | Printex Alpha alkylated according to example 10 |
| 0.0 | 0.0 | 0.0 | 0.0 | 0.0 |
| 29.0 | 5.4 | 2.8 | 1.7 | 0.8 |
| 43.0 | 5.5 | 3.2 | 2.0 | 0.9 |
| 66.5 | 5.6 | 3.4 | 2.1 | 1.0 |
| 89.5 | 5.6 | 3.5 | 2.2 | 1.0 |
| 164.5 | 5.7 | 3.7 | 2.3 | 1.0 |
| 189.5 | 5.7 | 3.7 | 2.3 | 1.0 |

The modification causes a reduction of the water absorption, that is particularly advantageous for applications with plastic. The water absorption of the FW1 and Printex Alpha modified according to example 10 with $C_{12}H_{25}$ groups is 2.0 and 1.3 percent by weight lower for the entire test than in the case of the particular reference black.

Example 14

Dispersion of Modified Black in Water

15% by mass FW1 per 100 parts water with 45% by mass (relative to the black) Hydropalat 3065 are dispersed in a stable manner in a standard dispersion. To this end, a dispersion is first carried out for 30 min at 5000 rpm with an Ultra Turrax and a subsequent dispersion for 60 minutes with ultrasound. However, 15% by mass FW1, that is functionalized according to example 8 with sulfonate groups, per 100 parts water is already dispersed in a stable manner with only 13% Hydropalat 3065 according to the above method. Thus, the functionalizing of the black results in an improvement of the dispersing qualities in aqueous applications.

Hydropalat 3065 is a product of Henkel KgaA Dusseldorf.

What is claimed is:

1. A carbon black with an organic group, wherein the organic group is connected to the carbon black via at least one carbon atom of a C—C single bond or double bond that is not a component of an aromatic system, and which contains at least one activating substituent on at least one carbon atom of the C—C single bond or double bond and contains no cyclic $C_3$ structure or 2,3-diazabicyclo[2.2.1]hept-2-ene, wherein the at least one activating substituent is selected from the group consisting of —CO–R, —CN, —$SO_2$R, —$SO_2$OR, and —CO–X–CO—, wherein R is H, alkyl, aryl, functionalized alkyl, or functionalized aryl, X is N–$R^5$, wherein
   $R^5$ is alkyl, Y-functionalized alkyl, polymers, cyclic organic groups, aryl, or Y-functionalized aryl of the form Ar—$Y_n$, wherein
   Y is selected from the group consisting of —OH, —SH, —$SO_3$H, —$SO_3$M, —B(OH)$_2$, —O(CH$_2$-CH$_2$-O)$_n$-H, —COOH, —COOM, —NH$_2$, —NR$_2$, —N((CH$_2$-CH$_2$-O)$_n$H)$_2$, —CON((CH$_2$-CH$_2$-O)$_n$H)$_2$, trialkoxysilyl, perfluoroalkyl, $R^5$, —NH$_3^+$, —NR$_3^+$, —SO$_2$-NR$_2$, —NO$_2$, —Cl, —CO—, —NR$_2$, —SS—, and —SCN;
   M is an alkali metal or alkaline earth metal; and
   n is 1 to 5.

2. The carbon black according to claim 1, wherein the activating substituents are acceptor substituents.

3. A carbon black with organic groups, obtained by reacting a carbon black to form at least one covalent bond with organic compounds containing a C—C double bond or triple bond that is not a component of an aromatic system whose C—C double bond or triple bond is activated by at least one substituent and the organic group contains no cyclic $C_3$ structure or 2,3-diazabicyclo[2.2.1]hept-2-ene, wherein the at least one activating substituent is selected from the group consisting of —CO–R, —CN, —SO$_2$R, —SO$_2$OR, and —CO–X–CO—, wherein R is H, alkyl, aryl, functionalized alkyl, or functionalized aryl, X is N–$R^5$, wherein
   $R^5$ is alkyl, Y-functionalized alkyl, polymers, cyclic organic groups, aryl, or Y-functionalized aryl of the form Ar—$Y_n$, wherein
   Y is selected from the group consisting of —OH, —SH, —SO$_3$H, —SO$_3$M, —B(OH)$_2$, —O(CH$_2$-CH$_2$-O)$_n$-H, —COOH, —COOM, —NH$_2$, —NR$_2$, —N((CH$_2$-CH$_2$-O)$_n$H)$_2$, —CON((CH$_2$-CH$_2$-O)$_n$H)$_2$, trialkoxysilyl, perfluoroalkyl, $R^5$, —NH$_3^+$, —NR$_3^+$, —SO$_2$-NR$_2$, —NO$_2$, —Cl, —CO—, —NR$_2$, —SS—, and —SCN;

M is an alkali metal or alkaline earth metal; and
n is 1 to 5.

4. A method of producing the carbon black according to claim 1, comprising: reacting a carbon black with organic compounds containing a C—C double bond or triple bond that is not a component of an aromatic system whose C—C double bond or triple bond is activated by at least one substituent and the organic group contains no cyclic $C_3$ structure or 2,3-diazabicyclo[2.2.1]hept-2-ene.

5. The method of producing the carbon black according to claim 4, wherein the reaction is carried out in a solvent or without solvent.

6. A method of using the carbon black of claim 1, comprising: adding said carbon black to a composition as a filler, reinforcing filler, UV stabilizer, conductive carbon black, or pigment.

7. A method of using the carbon black of claim 1, comprising: adding said carbon black to a composition as a pigment in rubber, plastic, printing inks, inkjet inks, paints, dyes, bitumen, concrete, or paper.

8. A method of using the carbon black of claim 1, comprising: adding said carbon black to a composition as a pigment in construction materials.

* * * * *

UNITED STATES PATENT AND TRADEMARK OFFICE
CERTIFICATE OF CORRECTION

PATENT NO. : 6,660,075 B2
DATED : December 9, 2003
INVENTOR(S) : Bergemann et al.

It is certified that error appears in the above-identified patent and that said Letters Patent is hereby corrected as shown below:

Title page,
Item [30], Foreign Application Priority Data, should read as follows:
-- [30]  Foreign Application Priority Data
Mar. 16, 2000   [DE]    German Pat. Off.        100 12 783.5 --

Signed and Sealed this

Sixth Day of July, 2004

JON W. DUDAS
*Acting Director of the United States Patent and Trademark Office*